United States Patent
Chung et al.

(10) Patent No.: US 9,269,478 B2
(45) Date of Patent: Feb. 23, 2016

(54) TRANSPARENT CONDUCTIVE FILM-PREPARING METHOD AND TRANSPARENT FILM PREPARED THEREFROM

(75) Inventors: Kwang Choon Chung, Yongin-si (KR); Hyun Nam Cho, Gunpo-si (KR); Ji Hoon Yoo, Bucheon-si (KR); Yun Ho Jung, Ansan-si (KR); Su Phil Kim, Incheon (KR)

(73) Assignee: INKTEC CO., LTD., Ansan-Si, Gyeonggi-Do (KR)

( * ) Notice: Subject to any disclaimer, the term of this patent is extended or adjusted under 35 U.S.C. 154(b) by 470 days.

(21) Appl. No.: 13/813,205

(22) PCT Filed: Jul. 27, 2011

(86) PCT No.: PCT/KR2011/005544
§ 371 (c)(1),
(2), (4) Date: Mar. 15, 2013

(87) PCT Pub. No.: WO2012/015245
PCT Pub. Date: Feb. 2, 2012

(65) Prior Publication Data
US 2013/0216844 A1     Aug. 22, 2013

(30) Foreign Application Priority Data
Jul. 30, 2010 (KR) ........................ 10-2010-0074378

(51) Int. Cl.
*H01B 1/12* (2006.01)
*H01B 13/00* (2006.01)
*C08J 7/04* (2006.01)

(52) U.S. Cl.
CPC ............. *H01B 13/0036* (2013.01); *C08J 7/045* (2013.01); *H01B 1/12* (2013.01); *C08J 2401/08* (2013.01); *Y10T 428/31703* (2015.04)

(58) Field of Classification Search
None
See application file for complete search history.

(56) References Cited

U.S. PATENT DOCUMENTS

| 6,117,366 | A | 9/2000 | Park et al. |
|---|---|---|---|
| 2006/0013967 | A1* | 1/2006 | Mikoshiba et al. ............ 428/1.1 |
| 2010/0208349 | A1 | 8/2010 | Beer et al. |
| 2010/0261031 | A1 | 10/2010 | Chung et al. |
| 2010/0288531 | A1* | 11/2010 | Koyama et al. ............ 174/126.2 |

FOREIGN PATENT DOCUMENTS

| CN | 101501533 | 2/2012 |
|---|---|---|
| JP | 2006-128098 | 5/2006 |
| JP | 2007-005290 | 1/2007 |
| KR | 10-0472496 | 5/2005 |
| KR | 10-0832002 | 5/2008 |

OTHER PUBLICATIONS

Office Action for corresponding Chinese Patent Application No. 201180037408.0, mailed Aug. 11, 2014.

* cited by examiner

*Primary Examiner* — Shamim Ahmed
*Assistant Examiner* — Bradford Gates
(74) *Attorney, Agent, or Firm* — Hauptman Ham, LLP

(57) ABSTRACT

Provided are a method for preparing a transparent conductive layer and a transparent conductive layer prepared by the method. The method for preparing a transparent conductive layer includes: 1) forming a cellulose derivative film by coating a transparent substrate with a cellulose derivative coating liquid; 2) hydrolyzing the cellulose derivatives by treating the cellulose derivative film using an alkaline agent; 3) forming a metal film by coating the hydrolyzed cellulose derivative film with an organic metal ink and reducing metals on the cellulose derivative; and 4) forming a conductive metal layer by heat-treating the cellulose derivative film with the metal film formed, and a transparent conductive layer prepared by the method. According to the present invention, a process can be simplified, and also a transparent conductive layer having excellent conductivity, transmittance, bending resistance, and low haze can be prepared.

9 Claims, No Drawings

TRANSPARENT CONDUCTIVE FILM-PREPARING METHOD AND TRANSPARENT FILM PREPARED THEREFROM

TECHNICAL FIELD

The present invention relates to a method for preparing a transparent conductive layer and a transparent conductive layer prepared by the method, and more particularly, to a method for preparing a transparent conductive layer including: 1) forming a cellulose derivative film by coating a transparent substrate with a cellulose derivative coating liquid; 2) hydrolyzing the cellulose derivatives by treating the cellulose derivative film using an alkaline agent; 3) forming a metal film by coating the hydrolyzed cellulose derivative film with an organic metal ink and reducing metals on the cellulose derivative; and 4) forming a conductive metal layer by heat-treating the cellulose derivative film with the metal film formed, and a transparent conductive layer prepared by the method.

BACKGROUND ART

Generally, a transparent conductive layer is used as an essential component of electric and electronic devices such as a power source in display devices, an electromagnetic wave shielding film in home appliances, a transparent electrode in various display fields such as a liquid crystal display (LCD), an organic light emitting diodes (OLED), a field emission display (FED), a plasma display panel (PDP), a flexible display, an electronic paper, or the like.

Currently, as a material of the transparent conductive layer, a conductive inorganic oxide material such as indium-tin oxide (ITO), antimony-tin oxide (ATO), antimony-zinc oxide (AZO), or the like, is mainly used.

The transparent conductive layer having relatively high conductivity and transmittance may be prepared using the material by a sputtering method, an ion beam method, a vacuum deposition method, or the like, that are generally used. However, in this method, cost for equipment investment is high, and it is difficult to mass-produce the transparent conductive layer and prepare a large size transparent conductive layer. Particularly, this method has a limitation in a transparent substrate requiring a low temperature process, such as a plastic film. At the time of deposition by the sputtering method, composition of the transparent conductive layer may be changed according to the conditions such as oxygen partial pressure, a temperature, and the like, and the transmittance and resistance of the thin film may be rapidly changed. In addition, even after the process is completed, a crack may be generated in the thin film, which increases the resistance. Therefore, a method for preparing a transparent conductive layer performed by coating a film using a wet coating method such as a spin coating method, a spray coating method, a dip coating method, a printing method, or the like, that are appropriate for low cost and a large size and then firing the coating film, or the like, has been suggested. For example, a transparent conductive layer using a metal fine particle and a binder is disclosed in Korean Patent Laid-Open Publication No. 1999-011487, a composition for a transparent conductive layer in which a hollow carbon nano fiber is added to tin oxide is disclosed in Korean Patent Laid-Open Publication No. 1999-064113, and a coating solution for a transparent conductive light selectively absorbing film in which neodymium oxide is added to tin oxide or indium oxide was disclosed in Korean Patent Laid-Open Publication No. 2000-009405. In addition, a method for manufacturing a solution for a transparent conductive layer containing a metal particle such as gold, silver, or the like, is disclosed in Japanese Patent Laid-open Publication No. 2003-213441.

A surface resistance of the transparent conductive layer prepared by the above-mentioned methods is high, that is, about $10^3$ to $10^4 \Omega/\square$, time-dependent changes, an increase in the surface resistance according to the change in surroundings and time, or the like, are generated therein, such that initial conductivity may not be maintained. Therefore, this transparent conductive layer has a limitation in being used as the transparent conductive layer.

DISCLOSURE

Technical Problem

An object of the present invention is to provide a method for preparing a transparent conductive layer having excellent conductivity, transmittance, bending resistance, and low haze through a simple process, and a transparent conductive layer prepared by the method. The present inventors developed a technology of forming a metal film on the cellulose derivative, thereby completing the present invention.

Technical Solution

In one general aspect, a method for preparing a transparent conductive layer includes: 1) forming a cellulose derivative film by coating a transparent substrate with a cellulose derivative coating liquid; 2) hydrolyzing the cellulose derivatives by treating the cellulose derivative film using an alkaline agent; 3) forming a metal film by coating the hydrolyzed cellulose derivative film with an organic metal ink and reducing metals on the cellulose derivative; and 4) forming a conductive metal layer by heat-treating the cellulose derivative film with the metal film formed.

Advantageous Effects

According to the present invention, the process may be simplified, and the transparent conductive layer having excellent conductivity, transmittance, bending resistance, and low haze may be prepared.

BEST MODE

A method for preparing a transparent conductive layer includes: 1) forming a cellulose derivative layer by coating a transparent substrate with a cellulose derivative coating liquid; 2) hydrolyzing the cellulose derivatives by treating the cellulose derivative film using an alkaline agent; 3) forming a metal film by coating the hydrolyzed cellulose derivative film with an organic metal ink and reducing metals on the cellulose derivative; and 4) forming a conductive metal layer by heat-treating the cellulose derivative film with the metal film formed.

Hereinafter, each of the steps of the present invention will be described in detail.

Step (1) of the present invention is a step of forming the cellulose derivative film by coating the transparent substrate with the cellulose derivative coating liquid.

As the transparent substrate, various substrates capable of easily forming a thin film or a pattern by a coating or printing process may be used. For example, a transparent plastic film made of polyimide (PI), polyethylene terephthalate (PET), polyethylenterenaphthalate (PEN), polyether sulfone (PES), Nylon, polytetrafluoroethylene (PTFE), polyetheretherketone (PEEK), polycarbonate (PC), polyarylate (PAR), or the like, or a glass substrate is coated with the cellulose derivative coating liquid to thereby prepare a thin film, or the cellulose derivative coating liquid may be directly printed thereon. Meanwhile, in the case in which the substrate is a cellulose or cellulose derivative film, the substrate may be directly used without being coated with the cellulose derivative coating liquid. The substrate as described above may be used after washing and degreasing or particularly, be subjected to pre-treatment. Examples of the pre-treatment includes plasma treatment, ion beam treatment, corona treatment, oxidation or reduction treatment, heat treatment, etching treatment, ultra-violet (UV) radiation treatment, and primer treatment using binders or additives, but the present invention is not limited thereto.

The cellulose derivative coating liquid is prepared by dissolving cellulose derivatives into a solvent, and may include additives such as a solvent, a stabilizer, a dispersant, a binder resin, a reducer, a surfactant, a wetting agent, a thixotropic agent, a leveling agent, or the like, as needed.

As the cellulose derivatives, at least one selected among cellulose acetate, cellulose propionate, cellulose butyrate, cellulose nitrate, alkyl cellulose, hydroxyalkyl cellulose, or the like, may be used alone or a combination thereof may be used. As the solvent for dissolving the cellulose derivatives, water; alcohols, such as methanol, ethanol, isopropanol, 1-methoxy propanol, butanol, ethylhexyl alcohol, and terpineol; glycols such as ethylene glycol and glycerin; acetates such as ethyl acetate, butyl acetate, methoxypropylacetate, carbitol acetate, and ethyl carbitol acetate; ethers such as methyl cellosolve, butylcellosolve, diethyl ether, tetrahydrofuran, and dioxane; ketones such as methyl ethyl ketone, acetone, dimethylformamide, and 1-methyl-2-pyrrolidone; hydrocarbons such as hexane, heptane, dodecane, paraffin oil, and mineral spirits; aromatic hydrocarbons such as benzene, toluene, and xylene; halogen-substituted solvents such as chloroform, methylene chloride, and carbon tetrachloride; acetonitrile, dimethyl sulfoxide, or mixtures of thereof may be used according to the kinds of cellulose derivatives.

As a coating method for the cellulose derivative coating liquid prepared as described above, a spin coating method, a roll coating method, a spray coating method, a dip coating method, a flow coating method, a doctor blade and dispensing method, an ink-jet printing method, an offset printing method, a screen printing method, a pad printing method, a gravure printing method, a flexography printing method, a stencil printing method, an imprinting method, a xerography method, a lithography method, or the like, may be selected and used according to physical properties of the coating liquid.

Step (2) of the present invention is a step of hydrolyzing the cellulose derivatives by treating the cellulose derivative film formed in step (1) using the alkaline agent.

This step is a step of forming a metal seed film by coating the cellulose derivative coating film prepared in step (1) with the alkaline agent and partially substituting —OCOR group or —OR group of the cellulose derivative on a surface of the coating film with —OH group to form a site for forming a complex with a metal, in order to reduce organic metal ink in the subsequent step to form a metal film.

As the alkaline agent, sodium hydroxide, potassium hydroxide, ammonium hydroxide, quaternary ammonium hydroxide, or the like, may be used, and as the coating method, various coating or printing methods in step 1) may be used.

Step (3) of the present invention is a step of forming the metal film by coating the hydrolyzed cellulose derivative film with the organic metal ink and reducing metals on the cellulose derivative.

When the hydrolyzed in step (2) cellulose derivative film is coated with the organic metal ink, the substituted —OH group in cellulose derivative reduces the organic metal ink, such that the metal film may be formed on the cellulose derivative film.

A kind of organic metal ink is not particularly limited. Any metal ink may be used in the present invention as long as an organic metal is present in the metal ink and organic material is dissolved to form a metal particle during a firing process.

Particularly, a metal ink containing an organic metal complex compound having a specific structure in patent application No. 2006-0090180 filed by the present applicant may be preferably used since the metal thin film has a uniform thickness, excellent conductivity, and a low firing temperature, and a residual material except for the conductive material does not remain after firing.

A method for preparing the metal ink containing the metal complex compound is performed by reacting a metal compound with one or at least two compounds selected among ammonium carbamate compounds, ammonium carbonate compounds, and ammonium bicarbonate compounds to prepare metal [ammonium carbamate compound, ammonium carbonate compound, or ammonium bicarbonate compound] complex, and then preparing metal ink including the same. In the present invention, the same method may be used.

Step (4) of the present invention is a step of forming a conductive metal layer by heat-treating the cellulose derivative film with the metal film formed.

In this step, the metal film formed on the cellulose derivative is heat-treated and fired, such that a conductive metal layer is formed, and finally, the transparent conductive layer may be prepared.

It may be preferable in view of physical properties of the thin film that the heat treatment of a transparent layer for improving transparency may be generally performed at 80 to 400, preferably 90 to 300, and more preferably 100 to 150. Additionally, in order to improve uniformity of the thin-film, the heat treatment may be performed in at least two steps at a low temperature and a high temperature within the above-mentioned range. For example, the heat treatment may be performed at 80 to 150 for 1 to 30 minutes and be performed again at 150 to 300 for 1 to 30 minutes.

Hereinafter, the present invention will be described in detail by the Examples, but the Examples are merely illustrations of the present invention, and the present invention is not limited thereto.

PREPARATION EXAMPLE

Preparation Example 1

Preparation of Cellulose Acetate Coating Liquid 99 mL of acetone and 1 g of cellulose acetate were put into a 50 mL Schlenk flask having a stirrer and stirred at room temperature for 30 minutes, thereby preparing a cellulose acetate coating liquid.

Preparation Example 2

Preparation of Cellulose Propionate Coating Liquid 99 mL of acetone and 1 g of cellulose propionate were put into a 50 mL Schlenk flask having a stirrer and stirred for 30 minutes, thereby preparing a cellulose propionate coating liquid.

Preparation Example 3

Preparation of Nitro Cellulose Coating Liquid 99 mL of acetone and 1 g of nitro-cellulose were put into a 50 mL Schlenk flask having a stirrer and stirred at room temperature for 30 minutes, thereby preparing a nitro-cellulose coating liquid.

Preparation Example 4

Preparation of Organic Silver Ink

In a 50 mL Schlenk flask having a stirrer, after 3.25 g of 2-ethylhexylammonium 2-ethylhexylcarbamate (10.75 mM), which is a viscous liquid, was dissolved in 57 mL of isopropylalcohol, 1 g of silver oxide (4.31 mM) was added thereto to induce reaction at room temperature. It could be observed that initially, a reaction solution was black slurry, but as a complex compound was generated while the reaction progressed, the color of the reaction solution was diluted and changed to be transparent. In addition, after reaction was carried out for 2 hours, a colorless and transparent solution was obtained. Therefore, it could be confirmed that the complex compound was successfully obtained. This solution was filtered using a membrane filter with a 0.45 μm pore size, thereby preparing an organic silver ink.

EXAMPLES

Example 1

Preparation of Transparent Conductive Layer 2 g of the cellulose acetate coating liquid prepared in Preparation Example 1 was spin-coated on a PET substrate and then dried at 150 or less for 3 minutes. 1 wt. % of KOH solution was spin-coated on a surface of the cellulose acetate coating film and then washed with distilled water (D/W) and methanol (MeOH). The organic silver ink prepared in Preparation Example 4 was spin-coated on the washed film and fired at 150 or less for 3 minutes, thereby obtaining a transparent conductive layer.

Example 2

Preparation of Transparent Conductive Layer 2 g of the cellulose propionate coating liquid prepared in Preparation Example 2 was spin-coated on a PET substrate and then dried at 150 or less for 3 minutes. 1 wt. % of KOH solution was spin-coated on a surface of the cellulose propionate coating film and then washed with D/W and MeOH. The organic silver ink prepared in Preparation Example 4 was spin-coated on the washed film and fired at 150 or less for 3 minutes, thereby obtaining a transparent conductive layer.

Example 3

Preparation of Transparent Conductive Layer 2 g of the nitro-cellulose coating liquid prepared in Preparation Example 3 was spin-coated on a PET substrate and then dried at 150 or less for 3 minutes. 1 wt % of KOH solution was spin-coated on a surface of the nitro-cellulose coating film and then washed with D/W and MeOH. The organic silver ink prepared in Preparation Example 4 was spin-coated on the washed film and fired at 150 or less for 3 minutes, thereby obtaining a transparent conductive layer.

Example 4

Preparation of Transparent Conductive Layer 2 g of the cellulose propionate coating liquid prepared in Preparation Example 2 was spin-coated on a PET substrate and then dried at 150 or less for 3 minutes. 2.5 wt. % of quaternary ammonium hydroxide $((CH_3)_4N(OH))$ solution was spin coated on a surface of the nitro-cellulose coating film and then dried at 150 or less for 3 minutes. The organic silver ink prepared in Preparation Example 4 was spin-coated on the washed film and fired at 150 or less for 3 minutes, thereby obtaining a transparent conductive layer.

Example 5

Preparation of Transparent Conductive Layer 2 g of the nitro-cellulose coating liquid prepared in Preparation Example 3 was spin-coated on a glass substrate and then dried at 150 or less for 3 minutes. 2.5 wt. % of quaternary ammonium hydroxide $((CH_3)_4N(OH))$ solution was spin coated on a surface of the nitro-cellulose coating film and then dried at 150 or less for 3 minutes. The organic silver ink prepared in Preparation Example 4 was spin-coated on the washed film and fired at 150 or less for 3 minutes, thereby obtaining a transparent conductive layer.

Example 6

Preparation of Transparent Conductive Layer 2 g of the nitro-cellulose coating liquid prepared in Preparation Example 3 was spin-coated on a glass substrate and then dried at 150 or less for 3 minutes. 2.5 wt. % of quaternary ammonium hydroxide $((CH_3)_4N(OH))$ solution was spin coated on a surface of the nitro-cellulose coating film and then dried at 150 or less for 3 minutes. The organic silver ink prepared in Preparation Example 4 was spin-coated on the washed film and fired at 300 or less for 3 minutes, thereby obtaining a transparent conductive layer.

The invention claimed is:
1. A method for preparing a transparent conductive layer, the method comprising:
   1) forming a cellulose derivative film by coating a transparent substrate with a cellulose derivative coating liquid;
   2) hydrolyzing the cellulose derivatives by treating the cellulose derivative film using an alkaline agent;
   3) forming a metal film by coating the hydrolyzed cellulose derivative film with an organic metal ink and reducing metals on the cellulose derivative; and
   4) forming a conductive metal layer by heat-treating the cellulose derivative film with the metal film formed.

2. The method of claim 1, wherein the transparent substrate is a polyimide (PI) film, a polyethylene terephthalate (PET) film, a polyethylenterenaphthalate (PEN) film, a polyether sulfone (PES) film, a Nylon film, a polytetrafluoroethylene (PTFE) film, a polyetheretherketone (PEEK) film, a polycarbonate (PC) film, polyarylate (PAR) film, or a glass substrate.

3. The method of claim 1, wherein as the cellulose derivatives, at least one ingredient selected from cellulose acetate, cellulose propionate, cellulose butyrate, cellulose nitrate, alkyl cellulose, hydroxyalkyl cellulose, or a combination thereof is used.

4. The method of claim 1, wherein in the cellulose derivative coating liquid, a solvent selected from
- water;
- alcohols selected from methanol, ethanol, isopropanol, 1-methoxy propanol, butanol, ethylhexyl alcohol, and terpineol;
- glycols selected from ethylene glycol and glycerin;
- acetates selected from ethyl acetate, butyl acetate, methoxypropylacetate, carbitol acetate, and ethyl carbitol acetate;
- ethers selected from methyl cellosolve, butylcellosolve, diethyl ether, tetrahydrofuran, and dioxane;
- ketones selected from methyl ethyl ketone, acetone, dimethylformamide, and 1-methyl-2-pyrrolidone;
- hydrocarbons selected from hexane, heptane, dodecane, paraffin oil, and mineral spirits;
- aromatic hydrocarbons selected from benzene, toluene, and xylene;
- halogen-substituted solvents selected from chloroform, methylene chloride, and carbon tetrachloride;
- acetonitirile;
- dimethyl sulfoxide; and
- a mixture of thereof is used.

5. The method of claim 1, wherein the alkaline agent is selected from sodium hydroxide, potassium hydroxide, ammonium hydroxide, and quaternary ammonium hydroxide.

6. The method of claim 1, wherein the coating method in step (1) or (3) is selected from a spin coating method, a roll coating method, a spray coating method, a dip coating method, a flow coating method, a doctor blade and dispensing method, an ink jet printing method, an offset printing method, a screen printing method, a pad printing method, a gravure printing method, a flexography printing method, a stencil printing method, an imprinting method, a xerography method, and a lithography method.

7. The method of claim 1, wherein the organic metal ink includes a metal ammonium carbamate compound complex, a metal ammonium carbonate compound complex, or a metal ammonium bicarbonate compound complex prepared by reacting a metal compound with one kind selected among from ammonium carbamate compounds, ammonium carbonate compounds, and ammonium bicarbonate compounds or a mixture of at least two thereof.

8. A method for preparing a transparent conductive layer, the method comprising:
1) preparing a transparent substrate which is a cellulose derivative film;
2) hydrolyzing the cellulose derivative by treating the cellulose derivative film using an alkaline agent;
3) forming a metal film by coating the hydrolyzed cellulose derivative film with an organic metal ink and reducing metals on the cellulose derivative; and
4) forming a conductive metal layer by heat-treating the cellulose derivative film with the metal film formed.

9. A transparent conductive layer prepared by the method of claim 1.

* * * * *